US005671114A

United States Patent [19]

Däumer et al.

[11] Patent Number: 5,671,114

[45] Date of Patent: Sep. 23, 1997

[54] GAS-FILLED OVERVOLTAGE DIVERTER

[75] Inventors: Wolfgang Däumer; Jürgen Boy, both of Berlin, Germany

[73] Assignee: Siemens Aktiengesellschaft, Munich, Germany

[21] Appl. No.: 569,180

[22] PCT Filed: May 18, 1994

[86] PCT No.: PCT/DE94/00589

§ 371 Date: Nov. 27, 1995

§ 102(e) Date: Nov. 27, 1995

[87] PCT Pub. No.: WO94/28607

PCT Pub. Date: Dec. 8, 1994

[30] Foreign Application Priority Data

May 26, 1993 [DE] Germany .......................... 43 18 994.6

[51] Int. Cl.[6] .................................................. H02H 3/22

[52] U.S. Cl. ..................... 361/120; 361/117; 313/231.11; 313/609

[58] Field of Search ..................................... 361/117, 120, 361/111; 313/231.11, 581, 609; 337/28, 30

[56] References Cited

U.S. PATENT DOCUMENTS

| | | | |
|---|---|---|---|
| 3,755,715 | 8/1973 | Klayum et al. | 317/62 |
| 4,266,260 | 5/1981 | Lange et al. | 361/120 |
| 4,287,548 | 9/1981 | Hahndorff | 361/120 |

FOREIGN PATENT DOCUMENTS

| | | | |
|---|---|---|---|
| 0 138 082 | 4/1985 | European Pat. Off. . | |
| 274980 | 11/1987 | European Pat. Off. . | |
| 2 400 254 | 8/1977 | France . | |
| 2207009 | 8/1973 | Germany . | |
| 1951601 | 7/1975 | Germany . | |
| 2705885 | 8/1978 | Germany . | |
| 27 35 865 | 2/1979 | Germany . | |
| 28 28 650 | 1/1980 | Germany . | |
| 621651 | 2/1981 | Switzerland . | |
| 2153138 | 8/1985 | United Kingdom . | |
| 2181887 | 4/1987 | United Kingdom . | |
| 2224884 | 5/1990 | United Kingdom | H01J 17/30 |
| 2249215 | 4/1992 | United Kingdom . | |

OTHER PUBLICATIONS

Effect Of a Strong Electric Field On Recombination And Intracenter Process In Alkali–Halide Crystals, A.P. Druszhinin and N.S. Nesmelov: *Opt. Spectrosc.* (*USSR*) 51(2), Aug. 1981, pp. 165–168.

*Primary Examiner*—Jeffrey A. Gaffin
*Assistant Examiner*—Sally C. Medley
*Attorney, Agent, or Firm*—Kenyon & Kenyon

[57] ABSTRACT

In a gas-filled overvoltage diverter, the electrodes are coated with an activation compound and are located on an insulator. At least one axial ignition strip is disposed on the inner surface of the insulator. The inner surface of the insulator also has an ionization source in the form of a coating of an electroluminescent material. The coating is connected to both electrodes and may take the form of a strip. Alternatively, the coating may cover the entire inner surface of the insulator. The alkali halide and/or alkaline-earth halide coating material may also contain dielectric or ferroelectric crystals.

6 Claims, 1 Drawing Sheet

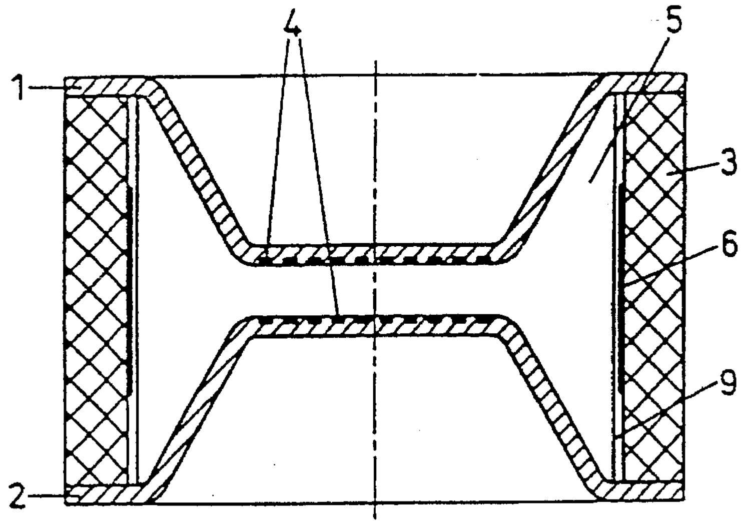
FIG 1
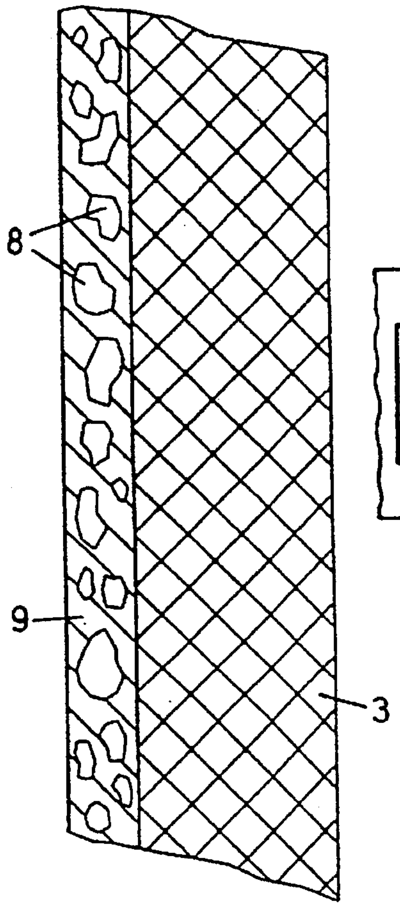
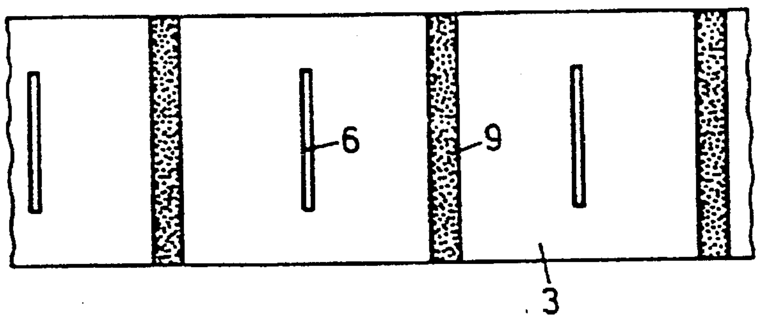
FIG 2
FIG 3

GAS-FILLED OVERVOLTAGE DIVERTER

FIELD OF THE INVENTION

The invention is in the field of electronic components. More specifically, the invention is used in the construction of gas-filled overvoltage diverters. To ensure the ignition properties, the electrodes of the gas-filled overvoltage diverters are coated with an activation compound, and at least one axially running ignition strip and an additional ionization source are applied on the wall of the insulating body.

BACKGROUND OF INVENTION

Overvoltage diverters filled with inert gas have a number of desired performance characteristics including: igniting voltage, response time, static response voltage, dynamic response voltage, extinction voltage and glow operating voltage. To achieve each of these desired performance characteristics, different measures like the constructive design of the electrodes, the type and pressure of the gas filling, and the selection of the activation compound arranged on the active surfaces of the electrodes must be adjusted to one another. Furthermore, to produce definitive ignition conditions, one or more ignition strips are customarily arranged on the inside wall of the glass or ceramic insulator and a special ionization source may also be provided. For example, a known overvoltage diverter has two electrodes inserted into the two front ends of a ceramic insulator; the electrode surfaces face each other and are coated with an activation compound in depressions in the electrode surface. A plurality of ignition strips running in the axial direction of the ceramic insulator are arranged on the inside wall. The ignition strips are called middle ignition strips because they do not directly interface with the electrodes as described in U.S. Pat. No. 4,266,260 and German Patent 28 28 650.

Furthermore, where gas-filled overvoltage diverters are arranged in a space shut off from outside light influence during their operation, an additional ionization source in the form of a point-shaped deposit of a radioactive material is customarily arranged on the inside wall of the insulator. Alternatively, the gas filling of the overvoltage diverter can consist of a radioactive gas as shown in U.S. Pat. No. 3,755,715.

SUMMARY OF THE INVENTION

The invention seeks to develop an overvoltage diverter that exhibits very slight ignition delay in the dark space, even without the use of a radioactive preparation.

The invention achieves this objective by another ionization source, in addition to the two electrodes, which comprises a coating connecting the two electrodes. The coating is made of an electroluminescent material based on alkali halides and/or alkaline-earth halides where the coating has a thickness of approximately 50 to 500 μm.

For example, potassium bromide and sodium bromide, potassium chloride and sodium chloride, and sodium fluoride and barium chloride can be used for the coating as described in (Opt. Spectrosc. (USSR) 51 (2), Aug., 1981, Pages 165–168). As parent substances, alkali-fluorides and alkali-bromides are to be particularly considered because they additionally contain alkaline-earth chloride. The additional alkaline-earth halide should be in a quantity of 5%–30% atomic percentage. Because of this additional alkaline-earth halide, the melting process necessary to apply the coating can be specifically controlled with regard to the melting temperature.

Because the coating contacts the two electrodes of the overvoltage diverter, the coating places an increased number of primary charge carriers at disposal in the overvoltage diverter so that, upon reaching the igniting voltage, the start of the gas discharge is initiated without time delay. Additionally, to strengthen this effect, the coating material can contain dielectric crystals (e.g., titanium oxide or aluminum oxide) or ferro-electric crystals (e.g., barium titanate, lithium niobate or lithium tantalate). Because such crystals have a particle size of approximately 10–30 μm, an increased charge density is produced at their interface resulting in a higher current flow in the electroluminescent coating and, consequently, in a higher photon yield.

In the simplest case, the electroluminescent coating is applied as strips along the center line of the insulator. One such strip can have the width of 1 to 5 mm. At the same time, the strip-shaped coating can cover the ignition strip or ignition strips provided on the inside wall of the insulator. Alternatively, a plurality of strip-shaped coatings can be arranged alternately with a plurality of ignition strips. Optionally, the entire inner surface of the insulator can also be provided with the coating.

BRIEF DESCRIPTION OF THE DRAWINGS

FIG. 1 shows an overvoltage diverter with a coating applied inside on the insulator.

FIG. 2 shows in cutaway portions the development of the inner surface of a ceramic insulator which is coated alternately with ignition strips and luminescent strips FIG. 3 shows a coating enriched with crystals.

DETAILED DESCRIPTION

The overvoltage diverter according to FIG. 1 consists of two bowl-like electrodes 1 and 2 which are soldered at the two front ends into the ceramic insulator 3. The active surfaces of the electrodes 1 and 2 are coated with an activation compound 4 which is embedded in shallow depressions in the electrodes. This activation compound is a customary compound based on alkali halides or alkaline-earth halides having a metallic additive such as a barium aluminum alloy, titanium, molybdenum and/or nickel.

The overvoltage diverter is provided with a gas 5 based on argon and/or neon, possibly with an addition of hydrogen.

Graphite ignition strips 6 are applied on the inside wall of the insulator 3; the strips are called middle ignition strips because they do not interface with either of the two electrodes. Furthermore, the inside wall of the ceramic insulator is provided with a coating 9 made of an electroluminescent material which contacts the two electrodes 1 and 2.

As shown in FIG. 3, crystals 8 can be embedded in the coating 9.

As shown in FIG. 2, a complete coating of the inner surface of the ceramic insulator 3 can be substituted with a strip-shaped coating 9 alternately arranged with ignition strips 6. For example, two or four ignition strips 6 and two or four strip-shaped coatings 9 can be present.

The application of the coatings 9 is accomplished by applying a pasty, aqueous solution of, for example, sodium fluoride with an addition of barium chloride (for example, 1 g=0.024 Mol NaF; 1.25 g=0.006 Mol $BaCl_2$) and by a heat treatment, for example, in the course of the soldering of the electrodes into the ceramic insulator. The heat treatment brings about a fusing of the coating material; this fusing is necessary for the later effectiveness of the coating.

We claim:

1. A gas-filled overvoltage diverter, comprising:

a hollow cylindrical insulator having a first frontend, a second front end and an inner surface; a first electrode arranged at said first front end of said insulator and coated with an activation compound;

a second electrode arranged at said second front end of said insulator and coated with said activation compound;

plurality of axially running ignition strips made of graphite applied on said inner surface of said insulator; and a plurality of coating strips applied on said inner surface of said insulator alternating with said plurality of ignition strips, each coating strip connecting said first electrode and said second electrode and being an ionization source, each coating strip being made of an electroluminescent material based on alkali halides, alkaline-earth halides, or a combination of alkali halides and alkaline-earth halides said plurality of coating strips having a thickness of approximately 50 to 500 μm.

2. The gas-filled overvoltage diverter of claim 1, wherein each coating strip includes alkali-fluorides, alkali-bromides or a combination of alkalifluorides and alkali-bromides as a parent substance with an addition of an alkaline-earth chloride.

3. The gas-filled overvoltage diverter of claim 2, wherein each coating strip includes sodium fluoride with an addition of barium chloride.

4. The overvoltage diverter of claim 3, wherein each coating strip is a material containing a plurality of dielectric or ferro-electric crystals.

5. The overvoltage diverter of claim 1, wherein each coating strip is a material containing a plurality of dielectric or ferro-electric crystals.

6. The overvoltage diverter of claim 2, wherein each coating strip is a material containing a plurality of dielectric or ferro-electric crystals.

* * * * *